Feb. 19, 1929.
W. OWEN
1,702,522
APPARATUS FOR TRIMMING GLASS SHEETS
Filed May 16, 1927    6 Sheets-Sheet 1
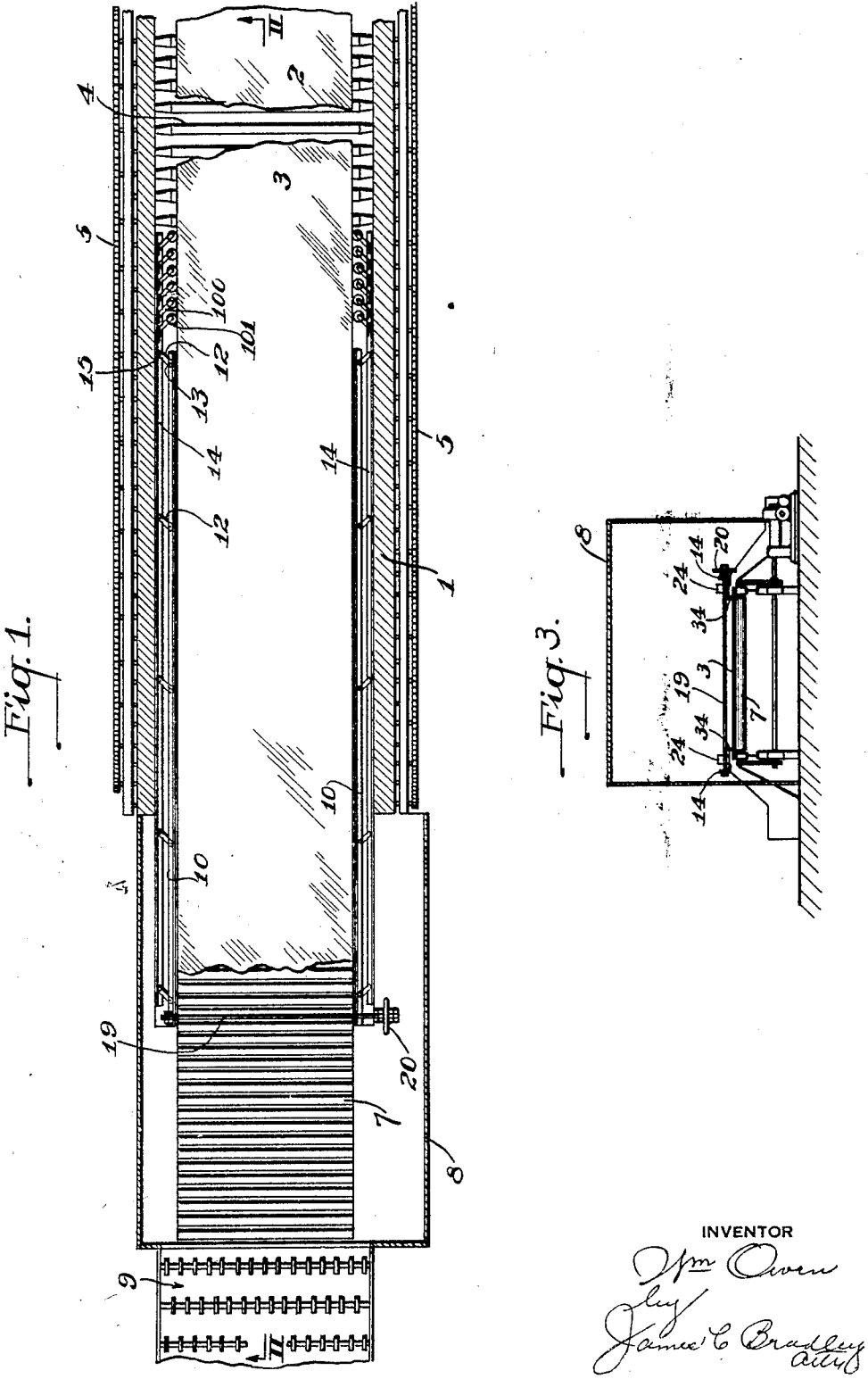
INVENTOR
Wm Owen
by
James C Bradley
atty

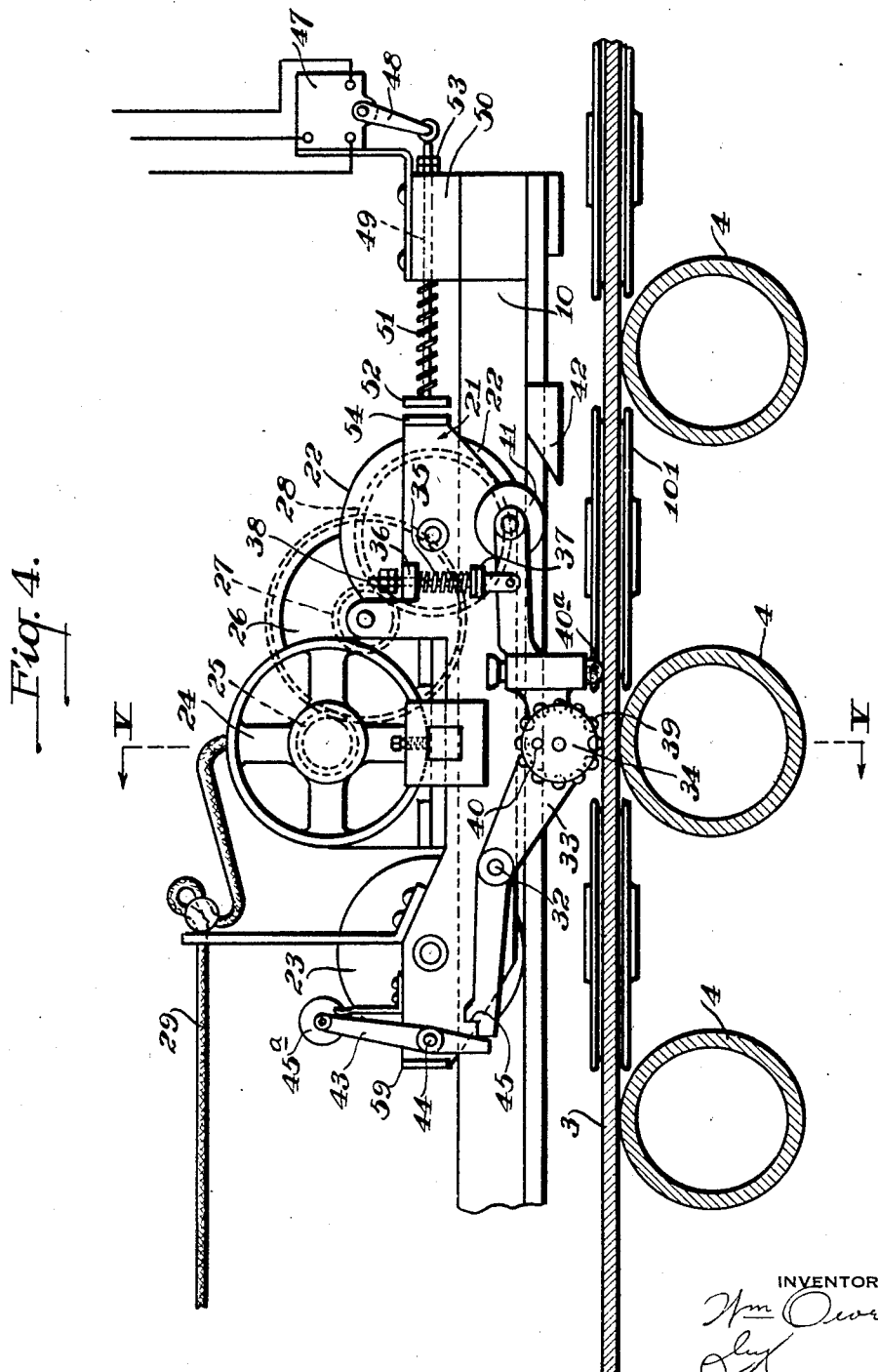

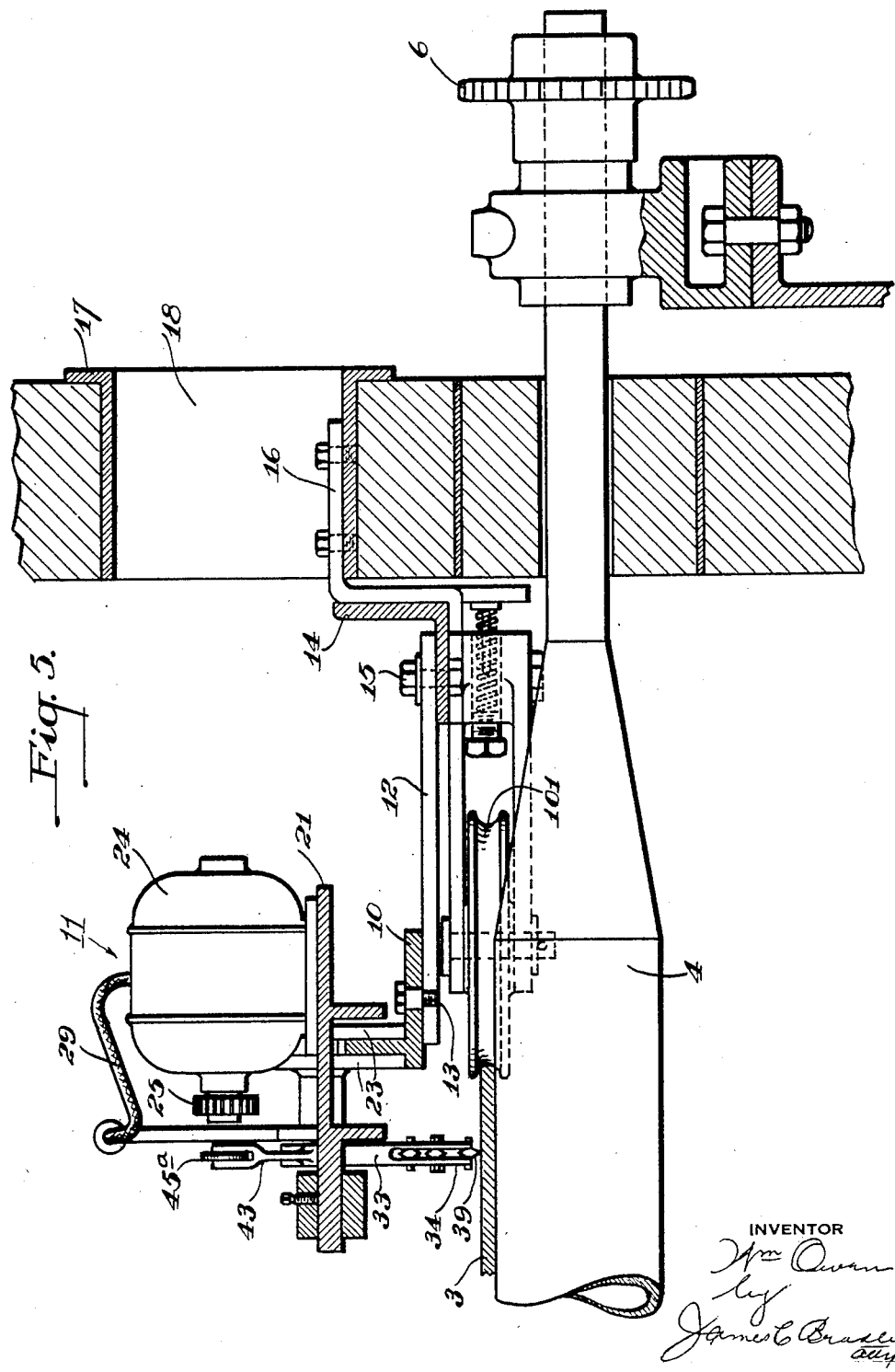

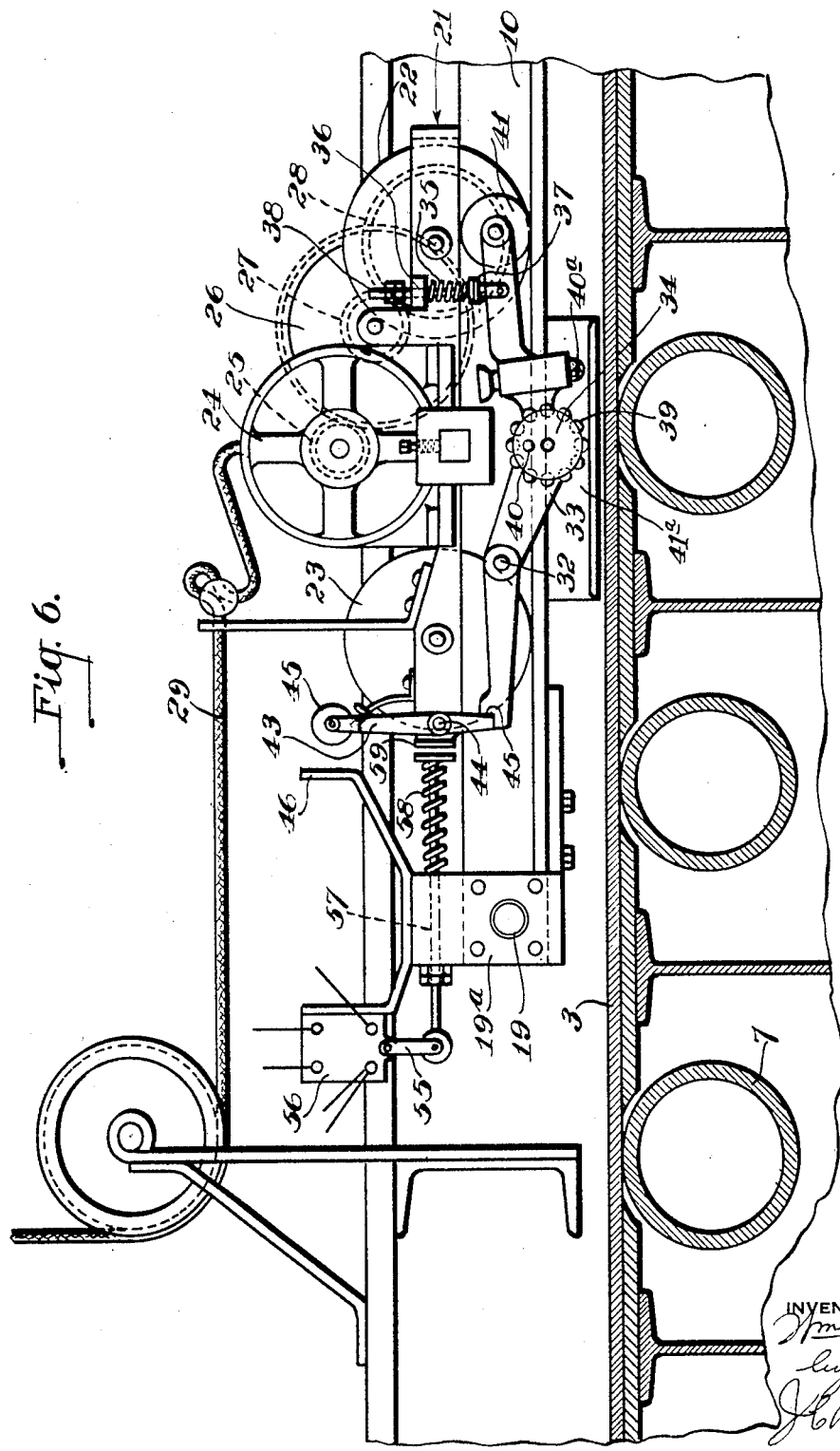

Feb. 19, 1929.
W. OWEN
1,702,522
APPARATUS FOR TRIMMING GLASS SHEETS
Filed May 16, 1927    6 Sheets-Sheet 5
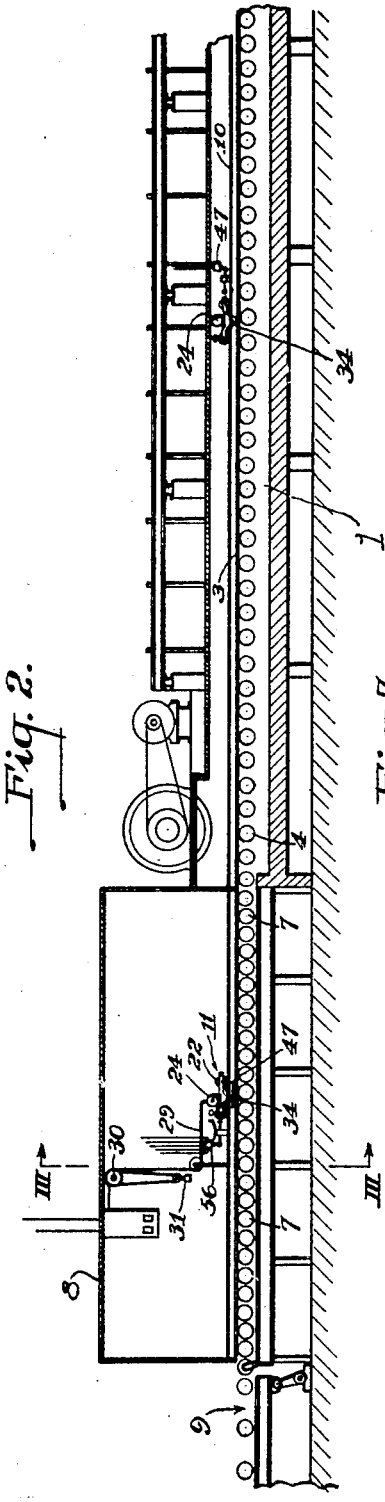
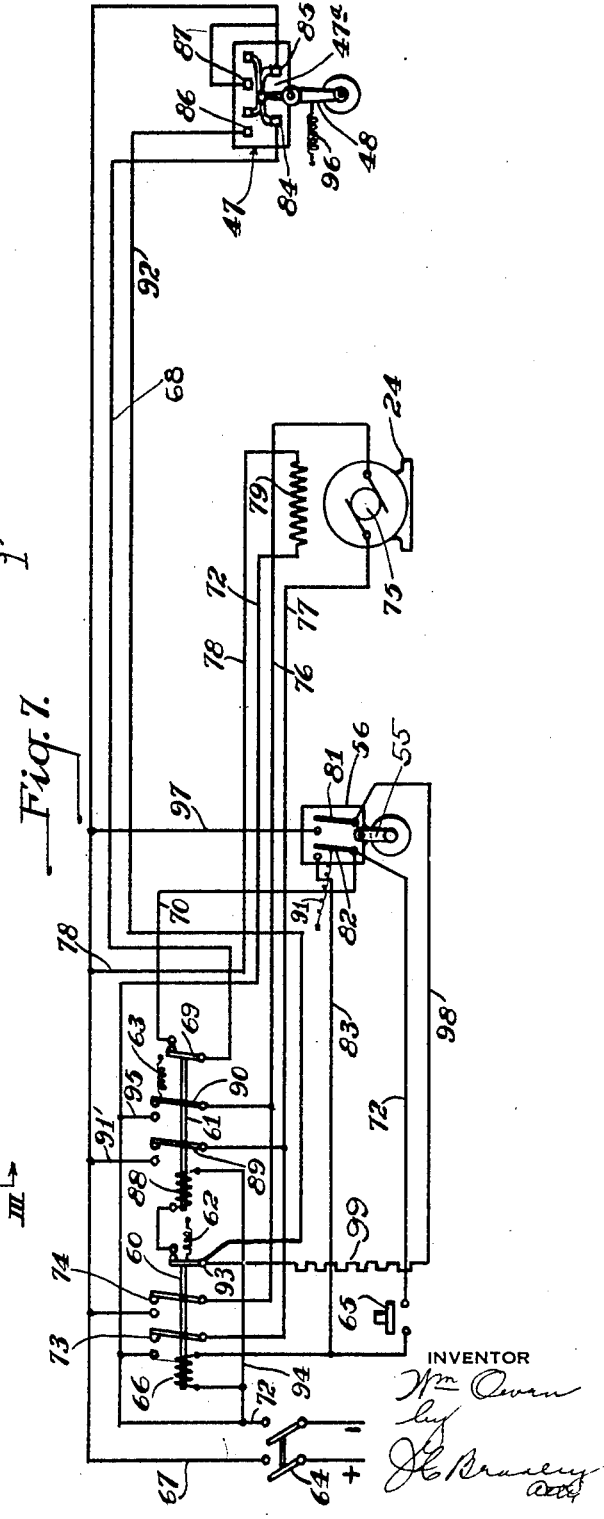
INVENTOR Feb. 19, 1929.                                                1,702,522
W. OWEN
APPARATUS FOR TRIMMING GLASS SHEETS
Filed May 16, 1927          6 Sheets-Sheet 6
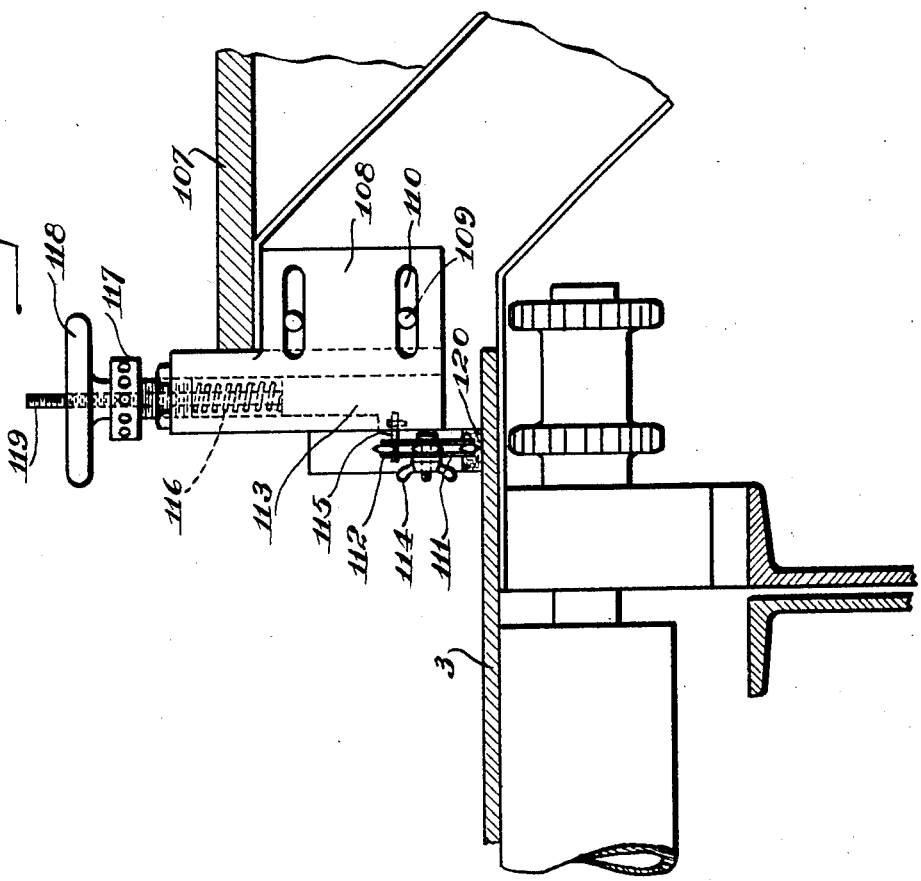
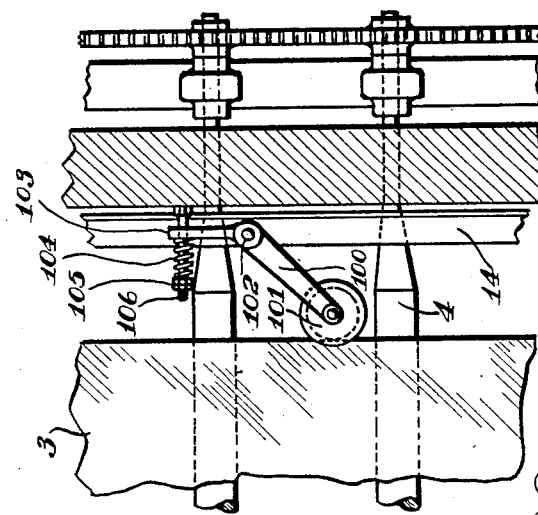
INVENTOR Patented Feb. 19, 1929.

1,702,522

UNITED STATES PATENT OFFICE.

WILLIAM OWEN, OF PITTSBURGH, PENNSYLVANIA, ASSIGNOR TO PITTSBURGH PLATE GLASS COMPANY, A CORPORATION OF PENNSYLVANIA.

APPARATUS FOR TRIMMING GLASS SHEETS.

Application filed May 16, 1927. Serial No. 191,692.

The invention relates to apparatus for trimming off the waste glass along the side edges of glass sheets. It is particularly designed for use at the outlet end of a leer, from which the glass emerges in a continuous sheet or in a series of relatively long sheets. The invention has for its principal objects, the provision of an improved apparatus; (1) which will cut the glass positively and with a minimum amount of attention on the part of the attendants about the machine; (2) which will center the glass sheets with respect to the cutting apparatus to insure trimming off the same amount of glass on the two sides of the sheets; (3) in which the movement of the cutting apparatus will be automatically stopped and such apparatus returned to starting position after each cut; and (4) which is simple in construction, and reliable in operation. Certain embodiments of the invention are illustrated in the accompanying drawings, wherein:

Figure 1 is a plan view of the apparatus. Fig. 2 is a section on the line II—II of Fig. 1. Fig. 3 is a section on the line III—III of Fig. 2. Fig. 4 is an enlarged section longitudinally of the apparatus, showing the trimming machine at its forward extreme of movement. Fig. 5 is a section on the line V—V of Fig. 4. Fig. 6 is a view similar to that of Fig. 4, but with the machine in its rear extreme of movement. Fig. 7 is a plan view of the wiring arrangement. Fig. 8 is a detail plan view showing one of the devices for centering the sheet. And Fig. 9 is a sectional view showing a modification.

Referring to the general arrangement of Figs. 1, 2 and 3. 1 is the outlet end of a leer through which the sheets of glass 2, 3, etc. are being carried upon the rollers 4, such rollers being driven in any desired manner, as by means of sprocket chains 5, 5 passing around suitable sprockets 6 on the ends of the rolls. The roller bed, upon which the glass is supported is extended out past the end of the leer, as indicated in Figs. 1 and 2, the rolls 7 being somewhat more closely spaced than the rolls 4 and being enclosed by the inspection shed 8. The glass is scored transversely in the inspection shed and after passing through the shed is received upon the snapping table 9, which is mounted so that it may be lowered in order to break the glass off along the lines at which it is scored.

Extending longitudinally of the leer and of a portion of the inspection shed are the rails 10, 10, upon which is mounted the truck 11, which carries the edge trimming or cutting devices. The rails 10, 10 are preferably of the L-section, as indicated in Fig. 5, and are supported by a series of links 12, 12, 12, etc., which links are pivoted at their outer ends to the tracks by means of the pivots 13 and at their inner ends are pivoted to the longitudinally extending rails 14 by means of the pivots 15 (Fig. 5). The rails 14 are in turn supported by brackets 16 hung upon the casings 17 surrounding the leer openings 18. The mounting of the rails in this manner provides for an adjustment, so that the cutters upon the trimming device mounted upon the rails may be adjusted in and out to vary the width of the strips which are cut from the edges of the sheets. The adjustment of the rails toward and from each other is accomplished by means of a transverse shaft 19 (Fig. 1), which is threaded through the blocks 19ª carried by the rails (Fig. 6) with right and left hand threads and which is provided with the hand wheel 20. By rotating this wheel, the rails may be moved toward and from each other to meet requirements.

The trimming means which is mounted upon each of the rails consists of a carriage 21, provided with two wheels 22 and 23, which are grooved, as indicated in Fig. 5, so as to fit over the vertical flange of the track. This carriage supports the motor 24, which drives the wheel 22 through the intermediary of the pinion 25 on the motor shaft and the spur gears 26, 27 and 28, the latter of which is keyed to the shaft of the grooved roller 22. Current is supplied to the motor by means of the cable 29, which passes around the two pulleys 30 and 31, the pulley 30 being fixed to the top of the inspection shed, while the pulley 31 is weighted to take up the slack, as indicated in Fig. 2. This provides the necessary amount of cable to follow the movement of the carriage as it travels to the right from the position shown in Fig. 2. On the return movement, the weighted pulley 31 takes up the slack, which is thus provided.

Pivoted to the carriage 21 at the point 32 is the arm 33, which carries the cutter wheel 34. This arm is pressed yieldingly downward by means of the spring 35 lying between the lug 36 on the carriage and the nuts 37 on the bolt 38. The cutter wheel 34 is provided with a plurality of cuttting discs 39 arranged around its periphery, and this wheel may be adjusted around its axis to bring the cutters successively into position, an index pin 40 serving to hold the wheel in any desired position of adjustment. Also carried by the arm 33 in advance of the cutter wheel is a pad or wiper of felt 40ª, which may be kept moistened with turpentine to facilitate the cutting by the disc. When one of the discs 39 becomes worn, the wheel is moved around one step to bring another disc into cutting position.

The arm 33 is provided at its forward end with a roller 41 and when the carriage approaches its extreme limit of movement in its travel to the right (Fig. 2), this roller engages the cam 42 (Fig. 4) carried by the track 10 and lifts the cutter out of contact with the glass sheet 3. The arm, upon reaching this position, is held there by means of the latch 43, pivoted to the carriage at 44 and adapted to engage the shoulder 45 at the left end of the arm 33. The cutter wheel is thus held out of contact with the glass while the carriage is moving to the left and back to its original starting position, as shown in Fig. 2. When the carriage reaches this starting position, the roller 45ª on the upper end of the latch 43 is engaged by the bracket 46 (Fig. 6) carried by the block 19ª, thus tripping the latch so that the arm 33, with the cutter wheel 34, is free to move downward. In order to prevent too sharp a blow when the cutter disc engages the glass, the shoe 41ª, shown in Fig. 6, is employed, such shoe being supported from the track or rail 10. When the carriage moves to the right again to start a new cutting operation, the wheel 34 rolls off the end of the shoe and onto the glass with very little shock, so that all danger of cracking the glass or injuring the edge of the cutter is avoided.

It will be understood that the carriages and their equipment, as mounted on the two rails 10, 10 are identical and that these carriages might have a single operating motor, if desired, although for certain reasons, it is preferred to have two independent units, one reason for this being that it permits of the independent adjustment of the two rails 10, 10. The cutting movement of the carriages to the left (Fig. 2) is determined by the location of the reversing switches 47, one of which is located above each track. These switches have depending arms 48 engaging the rods 49, slidably mounted in blocks 50, similar to the blocks 19ª (Fig. 6), and carried by the rails 10, 10. The rod 49 is held to the left (Fig. 4) by means of the spring 51, the position of the head 52 being made adjustable by means of the nuts 53. The switch is operated to cause a reversal of the motor when the shoulder 54 of the carriage comes in contact with the head 52 and moves the rod to the right. When the carriage moves from its extreme right-hand position, as shown in Fig. 4, to its extreme left-hand position, as shown in Fig. 6, the arm 55 of the limit switch 56 is operated by the carriage to stop the motor. This is accomplished by means of a rod 57 similar to the rod 49, mounted to slide through the block 19ª and held in its right-hand position by means of the spring 58. The head of the rod is engaged by the shoulder 59 on the carriage and moved to the left, thus swinging the arm 55 to cut-off position. From the foregoing it will be apparent that all the attention that is necessary on the part of the operator is to press a starting button from time to time, which causes the carriage to move to the left, from the position of Fig. 6, until it operates the reversing switch, after which the carriage returns automatically to starting position and stops by reason of the operation of the limit switch by the carriage.

The wiring diagram whereby the operation is automatically controlled, as above described, will be seen by reference to Fig. 7. The relays 60 and 61 having the usual solenoid bars are normally held in the position shown by means of the springs 62 and 63, the hand switch 64 is closed, and the switch arms 81 and 82 of the limit switch 56 are held open against the tension of a spring 91 by the carriage, when such carriage is in starting position (Fig. 6) with the rod 57 holding the arm 55 to the left. The switch member 47ª is also held in the position shown by the spring 96. Upon pressing the starting button 65, a circuit is established through the relay coil 66 via the line 67, the contacts of the reversing switch 47, line 68, arm 69, line 70, and the line 72, so that the arms 73 and 74 are closed. This gives a flow of current through the armature 75 of the motor 24 from the line 67 via the arm 74, the line 76, the line 77, the arm 73 and the line 72. At the same time, there is a flow through the motor field 79 from the line 67, via the line 78, and the line 72. As the carriage moves to the right, the spring 91 of the limit switch 56 closes the switch arms 81 and 82 of the limit switch, so that a holding circuit is established through the coil 66, before the button 65 is released. This holding circuit comprises the line 67, the switch member 47ª, the line 68, the arm 69, the line 70, the switch arm 82, and the line 83. The relay 60 with its arms 73 and 74 is, therefore, held closed after the spring push button 65 is released. The carriage continues its movement to the right until it strikes the arm 48 of the reversing switch 47, causing the switch member 47ª to move to the left, breaking connection between the contacts 84 and 85 and making contact at the points 86 and 87. This interrupts the circuit through the coil 66, so that the arms 73 and 74 move to open position and at the same time completes a circuit through the coil 88, via the line 67, switch member 47ª, line 92, arm 93 and line 94, so that the arms 89 and 90 are moved to closed position and the arm 69 is opened. Current now flows in a reverse direction through the armature 75, via the line 67, connection 91', arm 89, line 77, line 76, arm 90, connection 95 and line 72. The carriage, therefore, moves to the left and the switch member 47ª is moved to the position shown by the spring 96, thus interrupting the closing circuit through the coil 88. This coil, however, is still energized by a holding circuit flowing from the line 67 to the line 72, via the line 97, arm 81, line 98, resistance 99, arm 93 and line 94. The carriage continues its movement to the left until it strikes the arm 55 of the limit switch and moves the arms 81 and 82 to open position again. This interrupts the holding circuit through the coil 88, so that the arms 89 and 90 open, thus breaking the circuit through the motor armature and stopping the movement of the carriage. The parts are now in their original starting position and in order to make a new cut, it is necessary to press the button 65, after which the operation, as above described, will be repeated.

In order to center the sheets with respect to the two tracks 10, 10, thus insuring that the scoring tools will work at the proper distance from the edges of the sheet, yielding devices are provided for engaging the opposite side edges of the sheet before it reaches the cutting zone. These devices will be understood by reference to Figs. 5 and 8, in connection with Fig. 1. The centering devices are arranged in a series on each side of the sheet and each comprises a lever 100 carrying at its end a grooved roller 101, which is yieldingly pressed into engagement with the edge of the sheet. The lever 100 is pivoted at 102 to a bracket carried upon the longitudinally extending angle iron 14 (Fig. 5) and is provided with an arm 103, which is pressed yieldingly outward by means of a spring 104, such spring bearing at its outer end upon the nuts 105 carried by the stud 106. The stud is screwed at its inner end into the bracket upon which the lever is pivoted. In this manner, yielding pressure is applied to the opposite side edges of the sheet and, if this sheet is off center, the spring pressed means will bring it to a position such that its center line coincides with the center line of the leer. Any suitable means might be provided for giving the necessary yielding pressure to the side edges of the sheets as they approach the trimming apparatus.

Fig. 9 illustrates a modification, in which the movable carriages and tracks of the construction of Figs. 1 to 8 are omitted and cutters are employed held in relatively fixed position with respect to the sheet moving along therebeneath. The feature, which this construction has in common with the construction of Figs. 1 to 8 is the provision of the yielding means for centering the sheet as it approaches the cutting devices, such yielding means being the same as that heretofore described and illustrated in Figs. 1, 5 and 8. As illustrated in Fig. 9, the cutting devices are supported from the floor 107 of the inspection shed upon the brackets 108 held in position by the bolts 109 extending through slots 110, so that the position of the cutter may be adjusted in and out to meet varying conditions. The cutter in this case, comprises discs 111 carried by the wheel 112, such wheel being provided with a plurality of cutting discs, as in the construction of Fig. 6. The wheel is pivoted upon the end of the post 113 and held in adjusted position by means of the wing nut 114 and an indexing pin 115. The post is slidably mounted in the bracket 108 and is pressed down yieldingly by means of the spring 116, such spring being adjustable as to tension by means of the sleeve 117, which is screwed into the upper end of the bracket. The post 113 may be moved up by means of the hand wheel 118, which is threaded on the stud 119 secured in the post 113. The post also carries a pad 120, which precedes the cutting disc and which may be kept moistened by means of turpentine.

What I claim is:

1. The combination with means for moving glass sheets continuously forward, of edge trimming means comprising a pair of cutters mounted above the sheets adjacent the side edges thereof, means for moving the trimming means along the sheets in a direction opposite to the direction of travel of the sheets, and for returning them to starting position after each cut, and means for centering the forwardly moving sheets with respect to the edge trimming means preliminary to the trimming operation.

2. The combination with means for moving glass sheets continuously forward, of edge trimming means comprising a pair of cutters mounted above the sheets adjacent the side edges thereof, means for moving the trimming means along the sheets in a direction opposite to the direction of travel of the sheets, and for returning them to starting position after each cut, and means for centering the forwardly moving sheets preliminary to the trimming operation, such last means comprising spring pressed members engaging the opposite side edges of the sheets.

3. The combination with a roller bed for moving glass sheets continuously forward, of edge trimming means, comprising a cutter mounted above the sheets adjacent the side edges thereof, means for moving the trimming means along the sheets in a direction opposite to the direction of travel of the sheets, and for returning them to starting position after each cut, and yielding means engaging the opposite side edges of the sheets as they approach the trimming means for centering them preliminary to the trimming operation.

4. The combination with means for moving glass sheets continuously forward, of a track, edge trimming means mounted on the track for movement back and forth in the line of travel of the glass sheets and including a cutter for engaging and scoring the sheets along their side edges, and means for moving the trimming means in a direction opposite to the direction of travel of the sheets and scoring the glass during such movement and then returning the trimming means to starting position.

5. The combination with means for moving glass sheets continuously forward, of a track, edge trimming means mounted on the track for movement back and forth in the line of travel of the glass sheets and including a cutter for engaging and scoring the sheets along their side edges, means for moving the trimming means in a direction opposite to the direction of travel of the sheets and scoring the glass during such movement and then returning the trimming means to starting position, and means for lifting the cutters out of contact with the glass preliminary to the backward movement of the trimming means.

6. The combination with means for moving glass sheets continuously forward, of a track, edge trimming means mounted on the track for movement back and forth in the line of travel of the glass sheets and including a cutter for engaging and scoring the sheets along their side edges, means for moving the trimming means in a direction opposite to the direction of travel of the sheets and scoring the glass during such movement and then returning the trimming means to starting position, cam means operative at the end of the forward travel of the trimming means to lift the cutter out of contact with the glass, a catch for holding the cutter in raised position during the backward movement of the trimming means and means for tripping the catch when the trimming means again reach their starting position.

7. The combination with means for moving glass sheets continuously forward, of a track, a carriage mounted thereon for movement back and forth in the line of travel of the glass, a motor on the carriage for giving it said movements, edge trimming means on the carriage, comprising a cutter for engaging and scoring the sheets along their side edges, means for supplying current to the motor to cause it to drive the carriage along the track in a direction opposite to the direction of travel of the glass sheets, a reversing switch operable by the movement of the carriage for reversing the motor when the carriage has moved forward a predetermined distance, and a limit switch for cutting off the supply of current to the motor when the carriage has moved back to its starting position.

8. The combination with means for moving glass sheets continuously forward, of a track, a carriage mounted thereon for movement back and forth in the line of travel of the glass, a motor on the carriage for giving it said movements, edge trimming means on the carriage, comprising a cutter for engaging and scoring the sheets along their side edges, means for supplying current to the motor to cause it to drive the carriage along the track in a direction opposite to the direction of travel of the glass sheets, a reversing switch operable by the movement of the carriage for reversing the motor when the carriage has moved forward a predetermined distance, a limit switch for cutting off the supply of current to the motor when the carriage has moved back to its starting position, and means whereby the cutter is lifted from the glass when the carriage reaches its forward position of movement, and permitted to again engage the glass when the carriage reaches its starting position.

9. The combination with means for moving glass sheets continuously forward, of a track extending in the direction of travel of the sheets and adjustable toward and from the longitudinal center line of the sheets, edge trimming means mounted on the track for movement back and forth in the line of travel of the glass sheets and including a cutter for engaging and scoring the sheets along their side edges, and means for moving the trimming means in a direction opposite to the direction of travel of the sheets and scoring the glass during such movement and then returning the trimming means to starting position.

In testimony whereof, I have hereunto subscribed my name this 12th day of May, 1927.

WILLIAM OWEN.